United States Patent [19]
Leo

[11] Patent Number: 5,807,415
[45] Date of Patent: Sep. 15, 1998

[54] TRANSFORMABLE, COLLAPSIBLE, PERMANENT USE AIR FILTER FRAME

[76] Inventor: Ano Leo, 229 Sandstone Dr. NW., Calgary, Alta, Canada, T3K 3B9

[21] Appl. No.: 563,974

[22] Filed: Nov. 29, 1995

Related U.S. Application Data

[63] Continuation of PCT/CA94/00617 Nov. 3, 1994 published as WO95/22392 Aug. 24, 1995.

[51] Int. Cl.⁶ .................................................. B01D 46/02
[52] U.S. Cl. .............................. 55/385.3; 55/492; 55/500; 55/529; 55/DIG. 31; 206/223; 210/232; 210/239
[58] Field of Search .................................. 55/385.3, 496, 55/495, 492, 490, 500, 502, 501, 529, DIG. 31, DIG. 42, DIG. 28; 95/273; 210/232, 238, 239; 123/198 E; 206/223

[56] References Cited

U.S. PATENT DOCUMENTS

| | | | |
|---|---|---|---|
| 1,426,196 | 8/1922 | Jordahl | 55/529 |
| 2,966,959 | 1/1961 | Neumann | 55/490 |
| 3,016,984 | 1/1962 | Getzin | 55/492 |
| 3,107,990 | 10/1963 | Getzin | 55/501 |
| 3,486,626 | 12/1969 | Close | 55/500 |
| 3,853,509 | 12/1974 | Leliaert | 55/529 |
| 4,128,408 | 12/1978 | Poole | 55/498 |
| 4,265,647 | 5/1981 | Donachiue | 55/315 |
| 4,876,007 | 10/1989 | Naruo et al. | 55/492 |
| 5,100,443 | 3/1992 | Berto | 55/498 |
| 5,102,436 | 4/1992 | Grabowski | 55/DIG. 31 |
| 5,169,524 | 12/1992 | Meiritz et al. | 210/232 |
| 5,188,646 | 2/1993 | Nolen, Jr. | 55/DIG. 31 |
| 5,199,414 | 4/1993 | McMillon | 55/496 |
| 5,360,541 | 11/1994 | Gerakios | 210/232 |
| 5,514,197 | 5/1996 | Den | 55/528 |

*Primary Examiner*—Jay H. Woo
*Assistant Examiner*—Duane S. Smith
*Attorney, Agent, or Firm*—Paul Sharpe, McFadden, Fincham

[57] ABSTRACT

A transformable and collapsible filter frame which can support various air intake filtering media for internal combustion engines. One form of the filter frame corresponds generally to the shape of a carousel. The frame facilitates replacement of reusable filtering medium to be applied over its surface. The filtering media may be a polyurethane foam. The carousel filter frame structure includes expandable and adjustable parts, rings and struts which, when integrated are used as supporting members. The rings and struts include connecting members and can be easily disassembled and reassembled. The carousel filter body structure can be easily transformed into various configurations and sizes with the adaptable filter frame parts as desired to form other different types of filter shapes or forms. One shape of the carousel can be split to form various shapes of filter frames such as a circle, cylinder, shield, cone, oval, square, rectangle and various combinations thereof. Advantageously, the reusable filtering medium and adjustable frame is a practical alternative to the existing air filters which are thrown away after a single use.

17 Claims, 14 Drawing Sheets

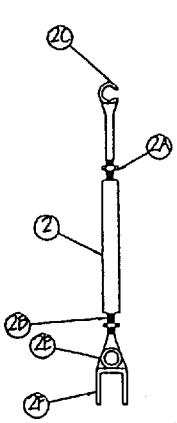
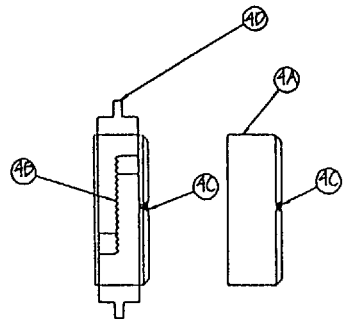
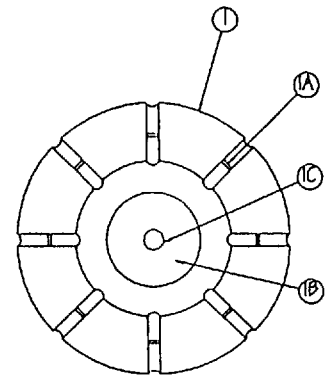
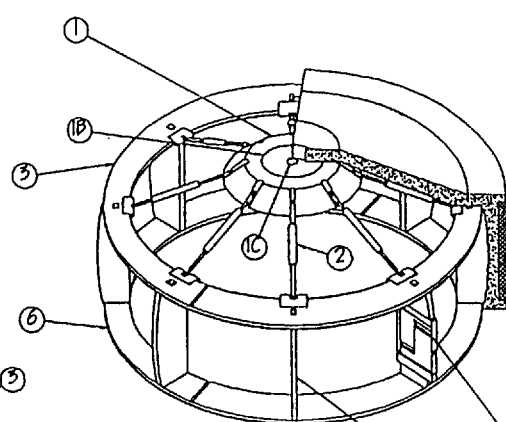
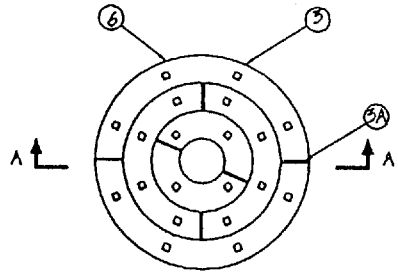
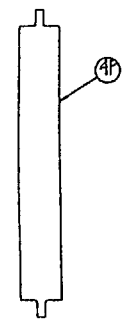
FIGURE 1A  FIGURE 1B  FIGURE 1C  FIGURE 1D  FIGURE 1E  FIGURE 1F  FIGURE 1G  FIGURE 1H  FIGURE 1I  FIGURE 1J
FIGURE "1"

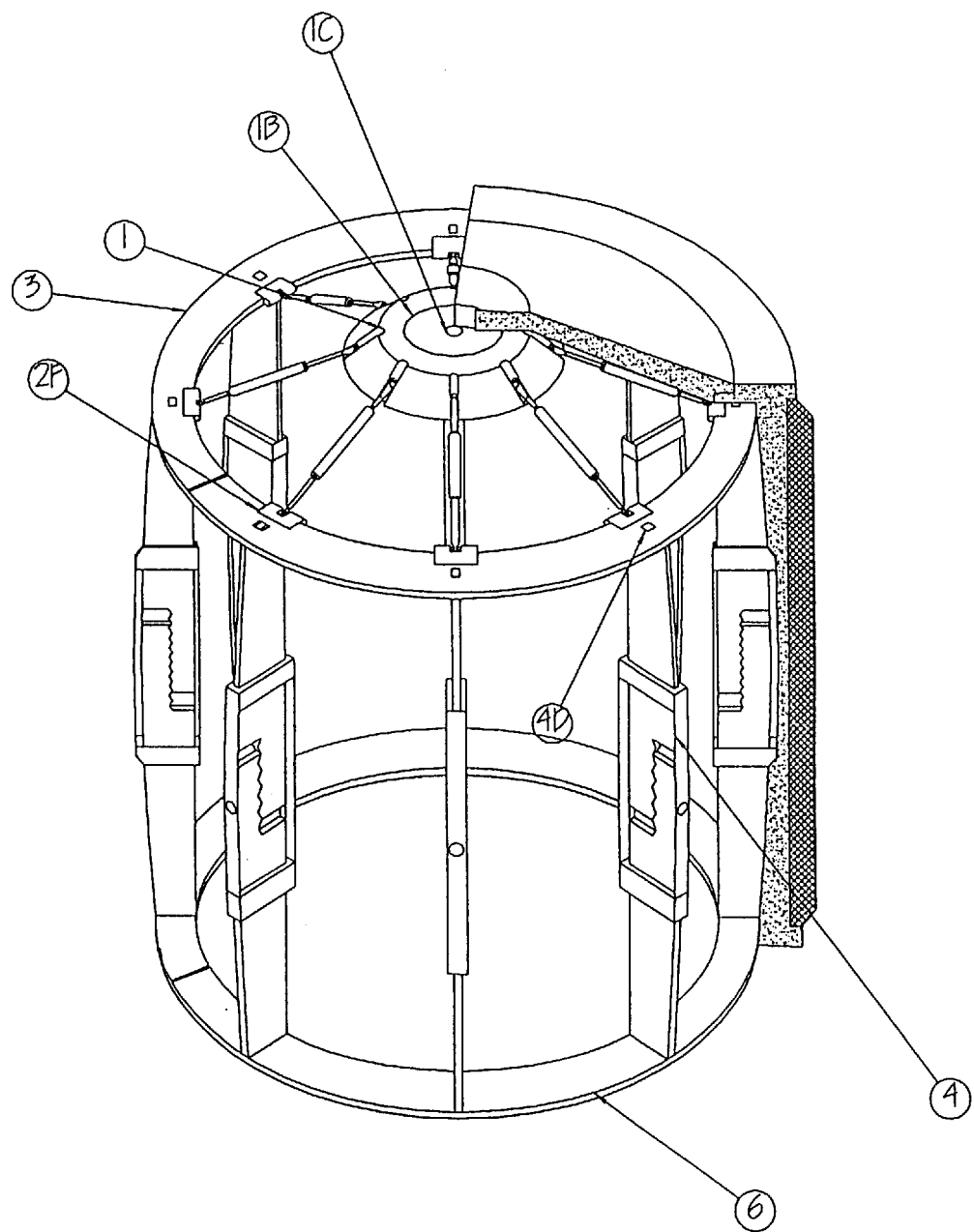
FIGURE "2"

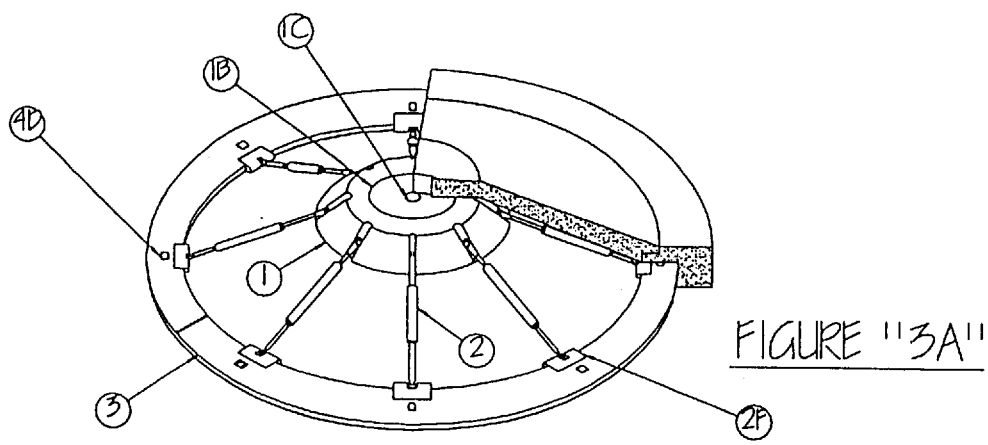
FIGURE "3A"
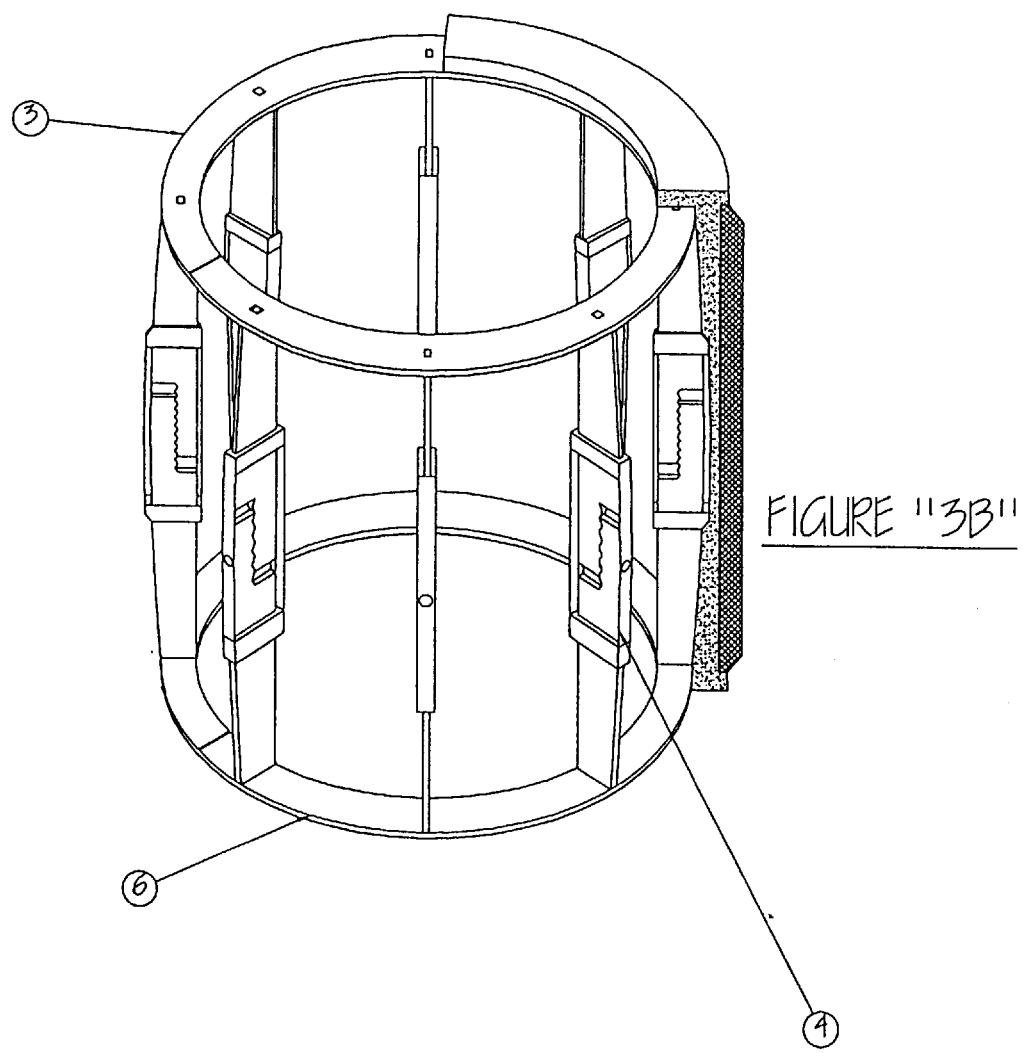
FIGURE "3B"
FIGURE "3"

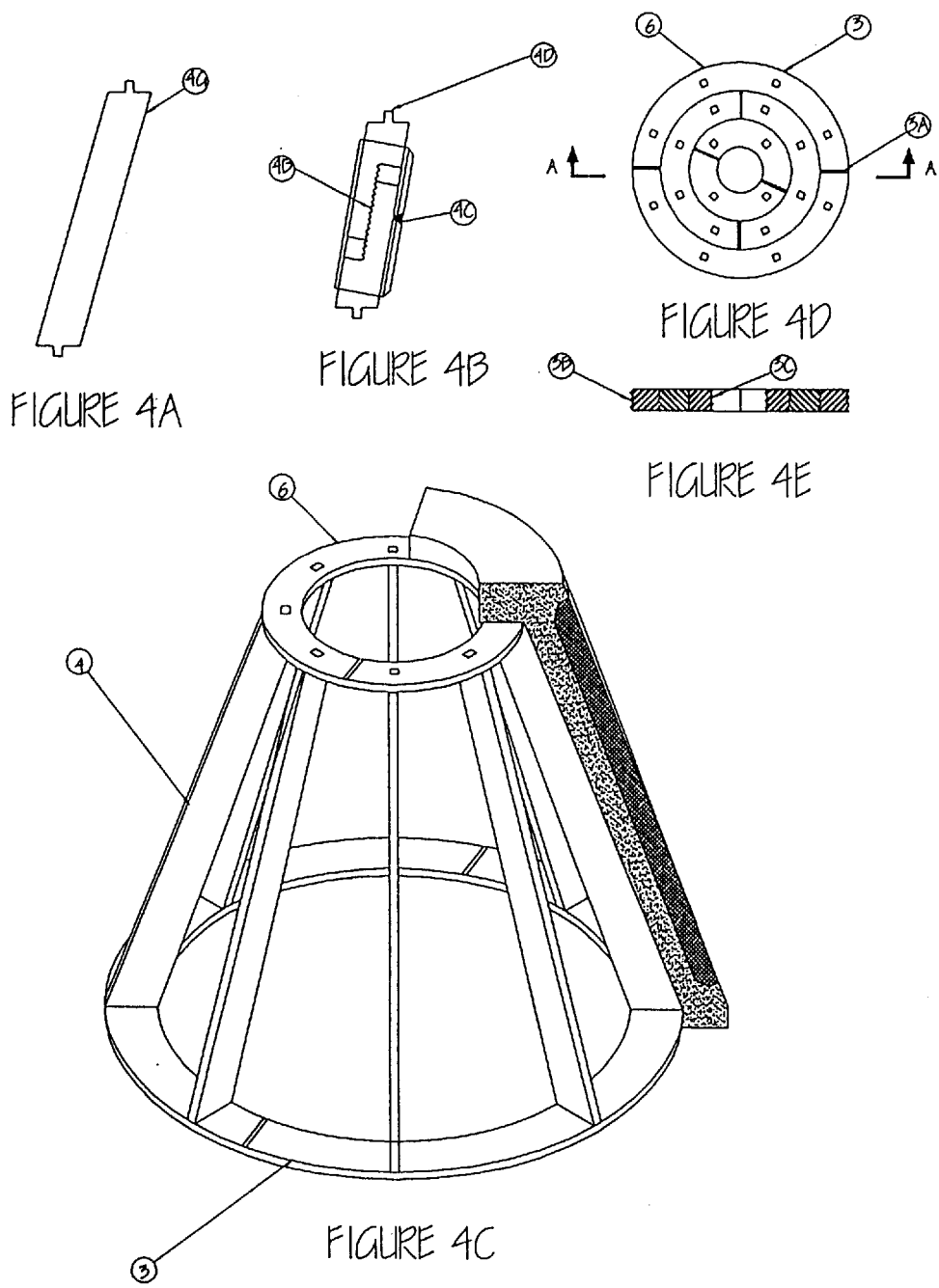

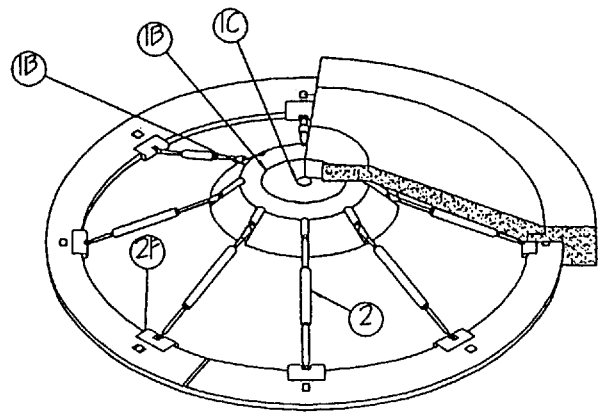
FIGURE "5A"
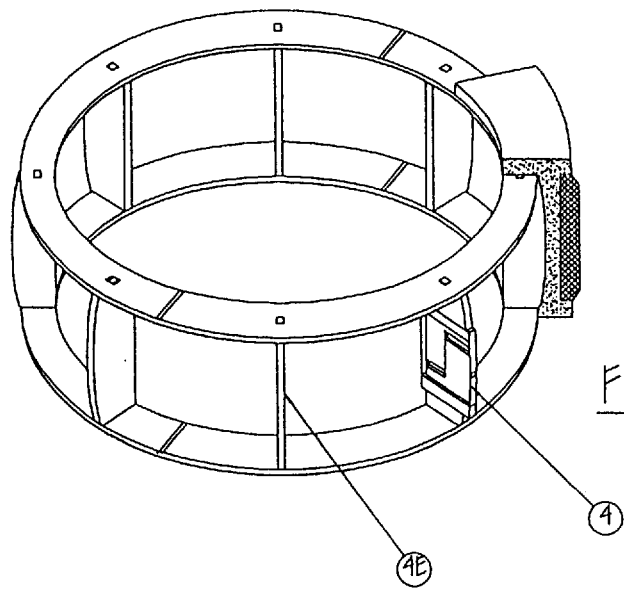
FIGURE "5B"
FIGURE "5"

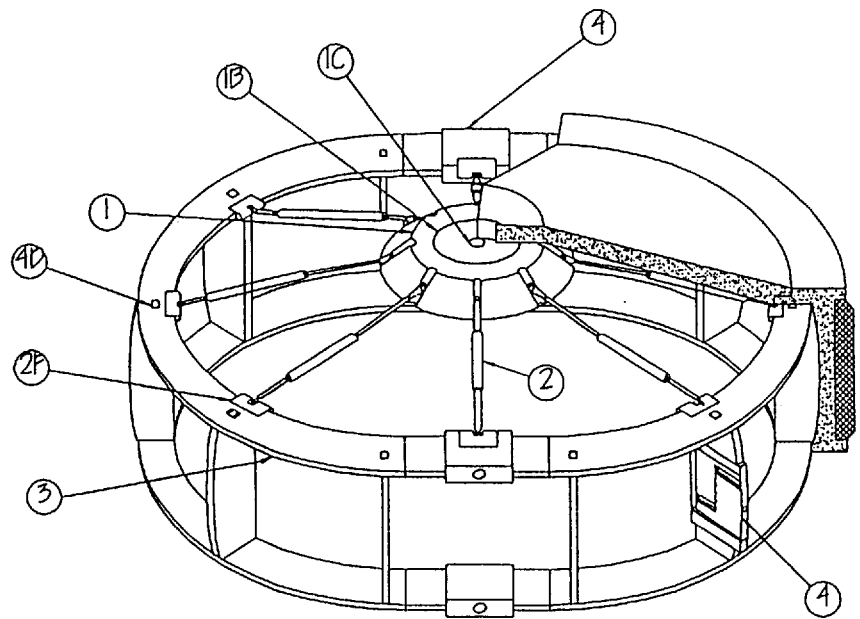
FIGURE "6"

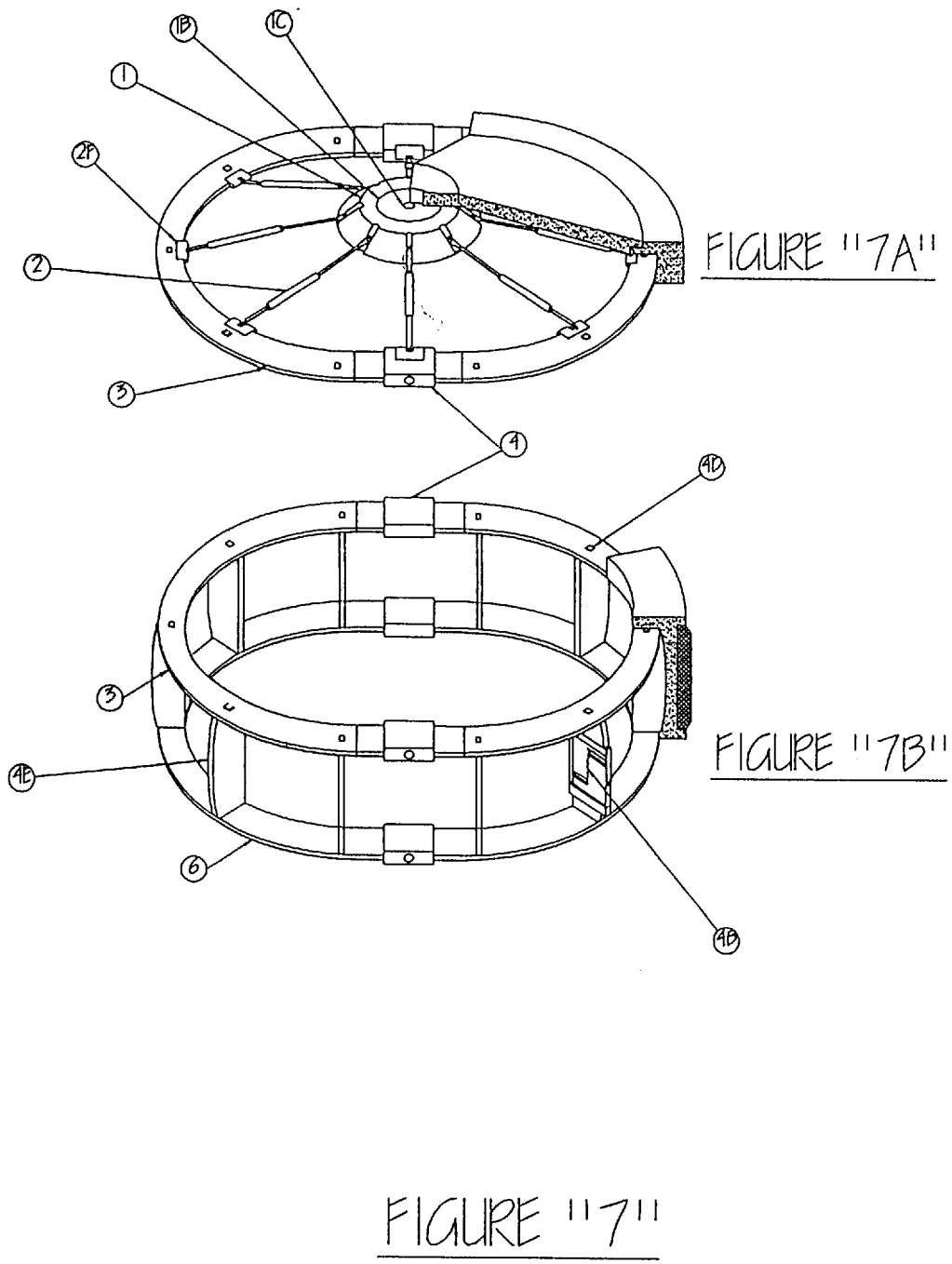
FIGURE "7"

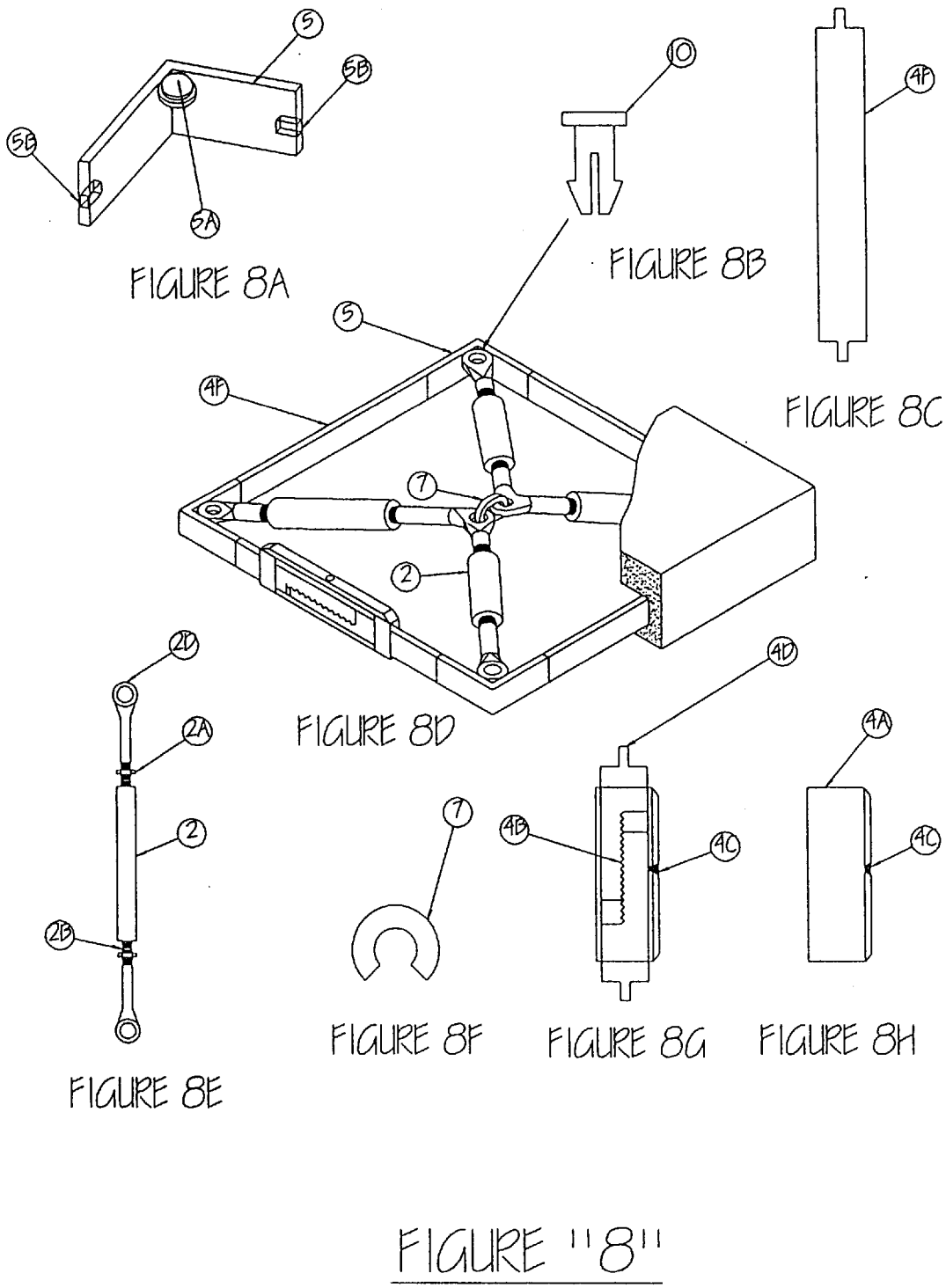

FIGURE "9"

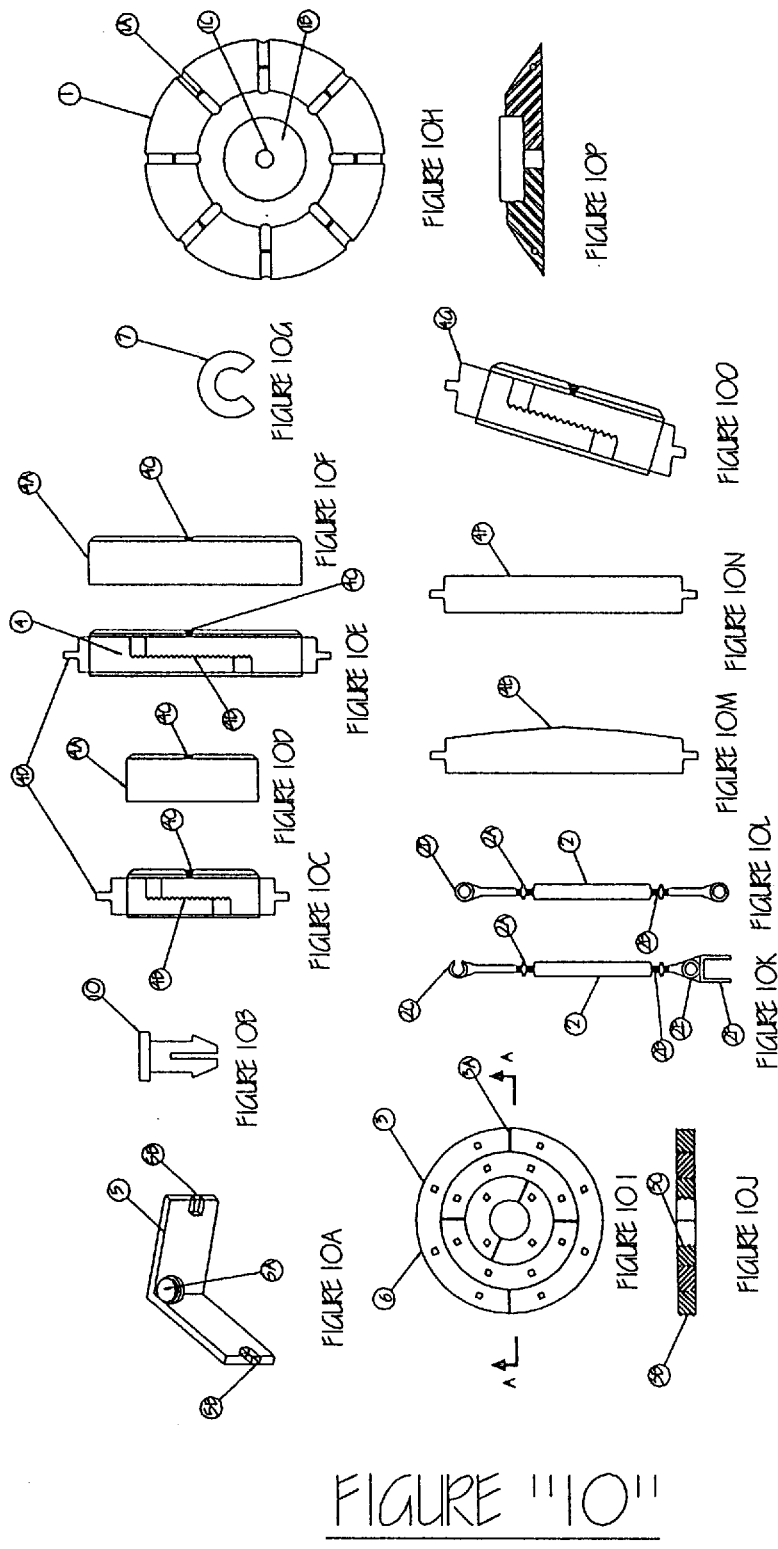
FIGURE "10"

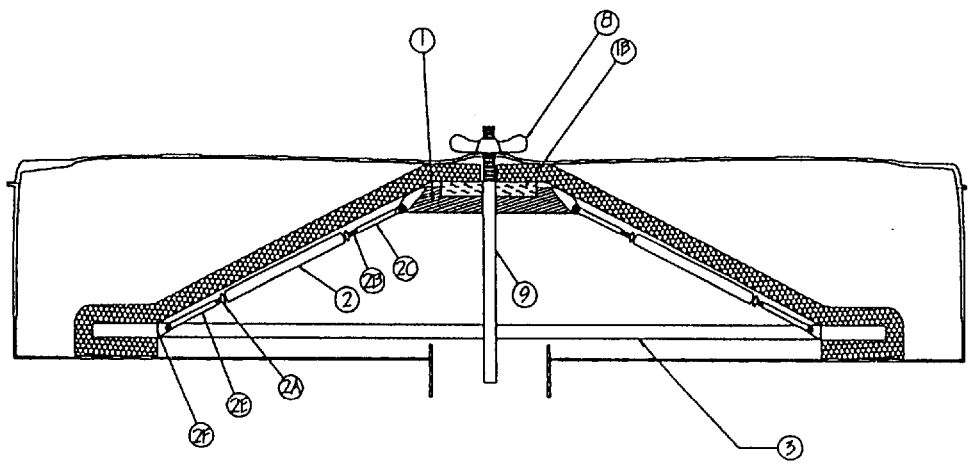
FIGURE "11"

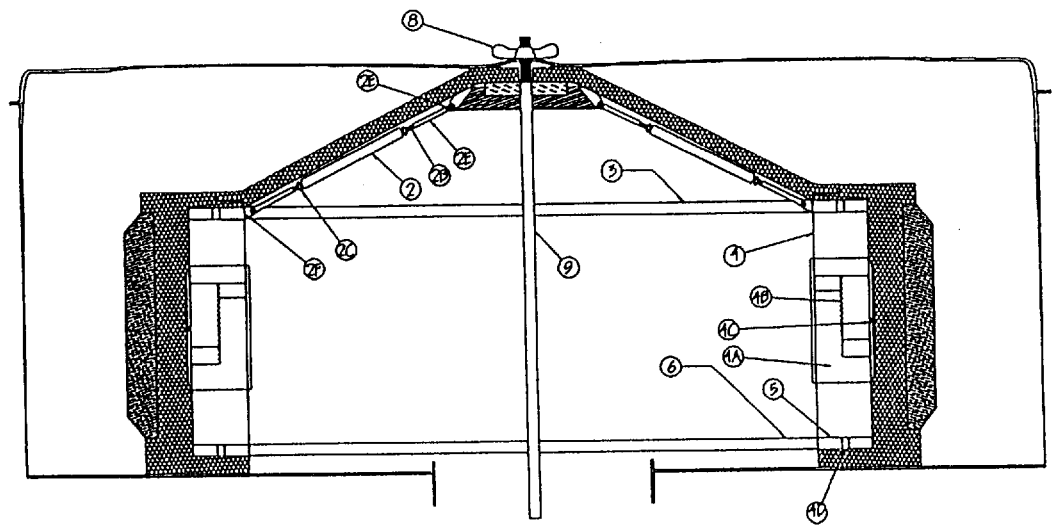
FIGURE "12"

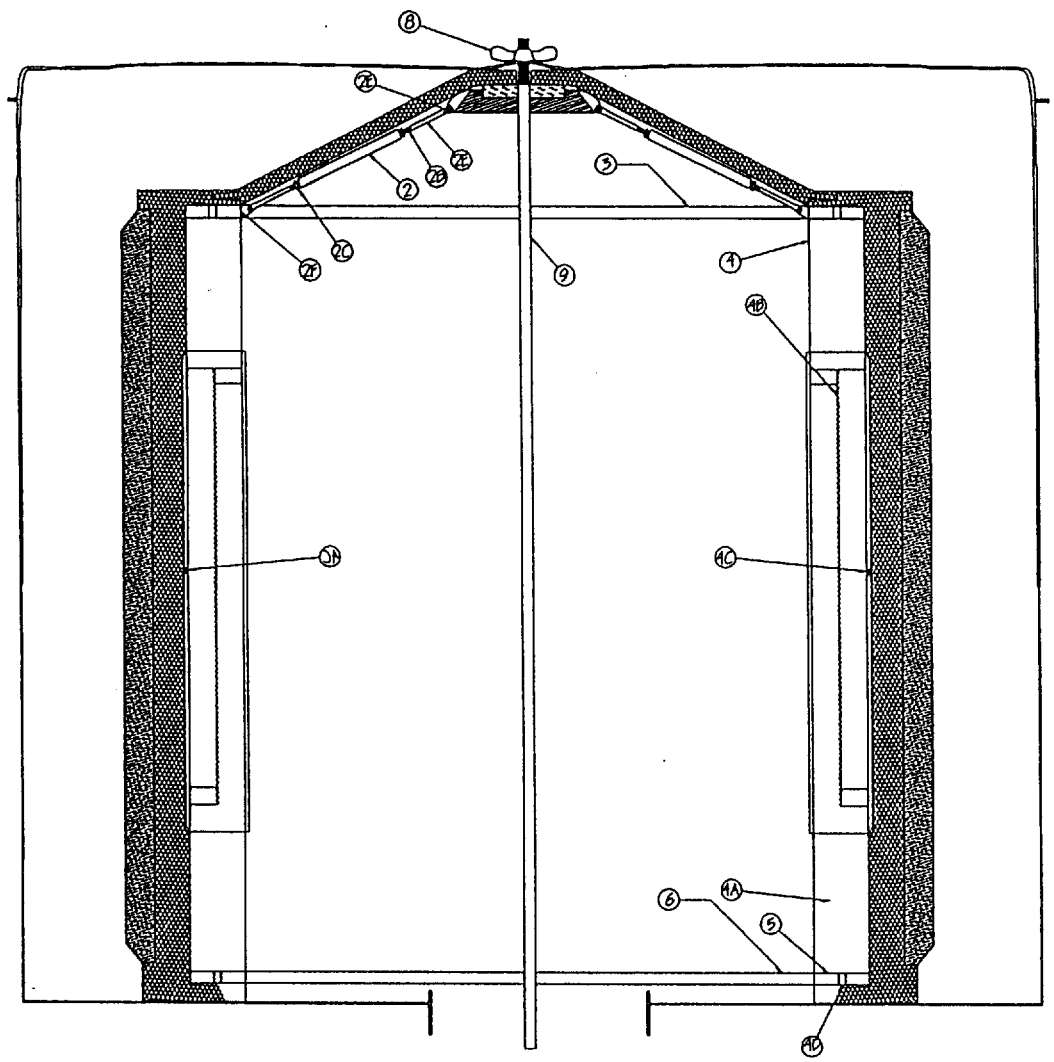
FIGURE "13"

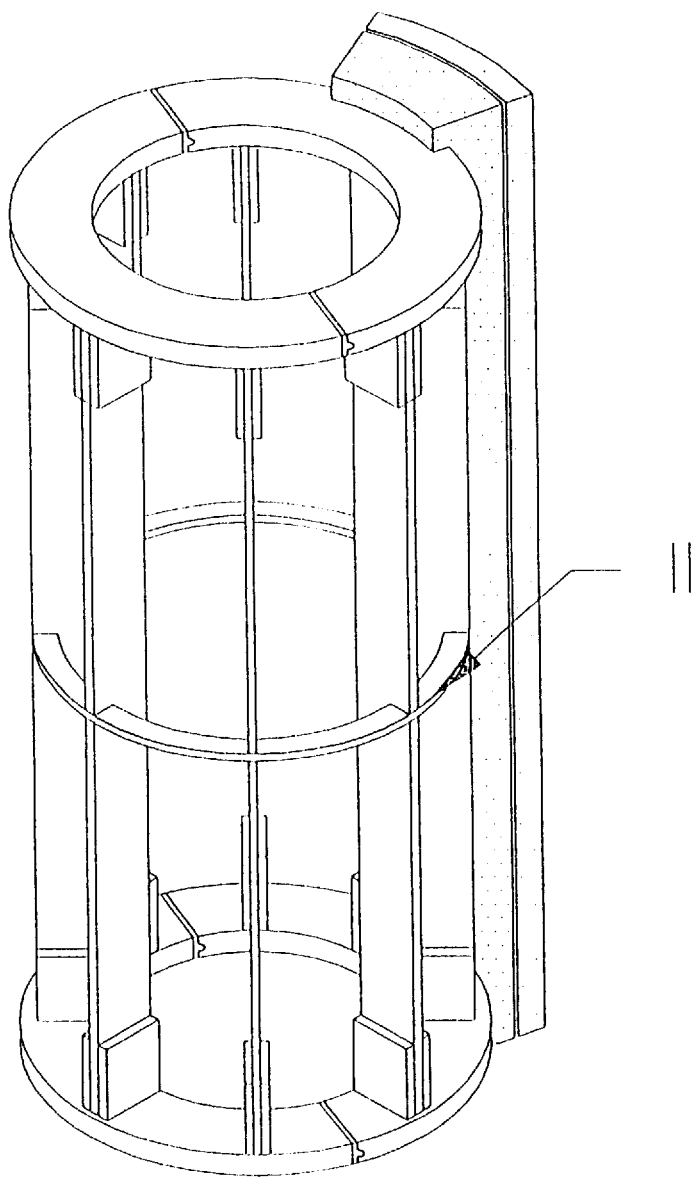
FIGURE "14"

TRANSFORMABLE, COLLAPSIBLE, PERMANENT USE AIR FILTER FRAME

This application is a continuation of PCT/CA 94/00617 filed Nov. 3, 1994, published as WO95/22392 Aug. 24, 1995.

FIELD OF THE INVENTION

The present invention is directed to an air filter frame and more particularly, the invention is directed to an air filter frame capable of being reconfigured.

BACKGROUND OF THE INVENTION

Presently, most of the conventional air filters on the market, contain a paper filtering medium encased in a lightweight metal mesh frame and bonded between two rubber or metal plates forming the frame work which is in one solid piece. The paper filter element is held in this type of framework with sealing materials on its top and bottom as one piece. This kind of conventional design seriously limits the flexibility of adapting other more ecologically friendly, more economical, and more effective filtering elements such as foam, fine mesh (wire), and other fibers for the purpose of being reusable and replaceable. The conventional filters are readily known to have a one time use (life expectancy) and are discarded after use when they become clogged with dirt and the air passage is impaired.

The currently employed filter media on the market are composed of oil-treated paper fiber or the like, relying on an accordion-fold design to maximize filtration surface. These media do not function well for volume filtering. Conventional air filter manufacturers have attempted to create more surface area by having more folds, thus making many outward and inward small angles. Air flow dynamics for such designs limit consistent and even dirt particle entrapment at the acutely folded angles. Airflow is highly restricted through the acute angles, whereby inward angles accumulate more dirt. This imbalance inhibits air flow and restricts even air flow. The conventional filter is a compromise in design between filtering fine dust particles and permitting the required air flow to the engine. The conventional filters' inadequacy is due to its characteristic flawed design. This flawed design limits the filtering medium that can be used with the conventional filter and the volume of air that can be cleaned.

Newly purchased conventional filters collect large particles of dust, but permit finer dust to pass through the filter media between the folds. Accumulated dust particles diminish air flow efficiency and an improper air/fuel burning ratio develops simultaneously. Engine oil contamination arising from the unfiltered small dust particles damages the moving component parts of the engine.

Today, society's ecological standard is increasing. As such, use of the conventional filter types are considered inefficient and inadequate. These filters are based solely on square surface area filtration which is not sufficient to provide a long period of adequate airflow through normal use; such filters have insufficient depth or inadequate volume filtration capacity. The conventional air filter is not capable of very fine particulate entrapment required for today's engines; further, they cannot satisfy society's desire for environmental protection.

The clogging of the air filter gradually creates an imbalanced air/fuel burning ratio—a major cause of oil contamination. The foregoing are causes that lead to more frequent oil changes, engine maintenance and premature engine failure. Furthermore, imbalanced air/fuel burning ratios elevate fuel consumption, increase pollutant emission through the exhaust and decrease horsepower. Consumers that service their cars properly have to purchase many conventional filters during the life of their car. Discarded conventional filters create large amounts of solid waste for land fills and natural resources used in their production depleted unnecessarily.

The conventional air filter is not environmentally friendly, economically viable or effectual for any sustained time.

The present invention is directed to satiating the need in the prior art for an effective filtration apparatus which is not limited by the difficulties in the prior art.

SUMMARY OF THE INVENTION

One object of the present invention is to provide an improved air filter frame which is collapsible and which can be reconfigured into a variety of shapes, depending on specific use.

A further object of one embodiment of the present invention is to provide a transformable intake air filter frame, comprising:

a plurality of different frame components for forming a filter frame when connected, at least some of the frame components being adjustable in size; and connecting means for releasibly connecting the frame components, whereby the components may be connected to first form a carousel configuration and the carousel subsequently transformed to a second shape by connecting different frame components.

An even still further object of one embodiment of the present invention is to provide a filter frame kit, comprising:

a plurality of different frame components for forming a filter frame when connected, the filter frame components comprising:
    a plurality of adjustable elongate struts;
    a plurality of angular framed components; and
    a plurality of arcuate framed components, each of the components having connecting means for releasibly connecting the frame components together for forming a filter frame.

One of the materials that was chosen for the filtering medium, is a heat resistant polyurethane foam strip that can be wrapped around the frame structure. It can be tailored machine-cut into various shapes and sizes as required. The filter medium can be taken off for cleaning, reuse and/or replacement. This type of foam medium has been proven to be reusable many times when used in accordance with instructions. The composition of the foam is a honeycombed network of thousands of tiny interlocking open cells. When thoroughly wetted with a sticky agent, the filter media is in its most effective stage for air cleaning and dirt entrapment. The air, when entering the foam media, bounces around from cell to cell. The air flows through the medium, but the dirt remains entrapped in the network of honeycomb cells and stuck therein by the sticky agent on the cell walls. The foam medium has depth and filtering volume which can efficiently entrap more dirt than conventional filter medias. Small finer dust particles are also entrapped effectively and the foam medium provides a longer and steadier flow of clean air to the engine. Compared to the conventional filter medium, foam medium when enhanced with sticky agent has a longer, steadier and more effective filtering capacity and usage time before it must be washed and made ready for reuse.

The general objective of the invention is to provide an ecologically sound intake air filter frame for internal combustion engines with a permanent use filter frame, enabling an ecological friendly and economical alternative to the conventional filter. By using a reusable filter frame, various reusable filtering media which are available now and in the future can be utilized.

One purpose is to provide an interchangeable framework that is cost effective in manufacturing, shipping and handling to the benefit of the manufacturers and consumers.

A concomitant purpose of the invention is to manufacture an intake air filter frame which creates larger open air filtering areas over existing limited air filter housing space and to apply better filtering medium results in a more efficient filter.

One embodiment of the invention, an intake air filter frame, can be made of various grades of plastic, metal or wood and is designed for use on internal combustion engines. The invention, the filter frame assembly has great flexibility as it is collapsible, reformable and can be folded. It is shipped flat to the consumer who can assemble it easily by snapping the parts together. The invention can be expanded lengthwise, widthwise and depthwise with its adjustable support members (struts) and its adjustable frame ends. Ultimately, the filter frame can be transformed into many shapes. Great versatility is achieved by it being capable of fitting many filtering sizes and applications on internal combustion engines. The invention is economical to manufacture, it is more efficient than conventional filters through its adaptability to use various filter media but most importantly, it is a durable and ecological product because it is a non-throw-away permanent use filter frame.

Having thus described the invention, reference will now be made to the accompanying drawings illustrating preferred embodiments.

BRIEF DESCRIPTION OF THE DRAWINGS

FIG. 1A is a plan view of one element of the invention;

FIG. 1B is a side view of a spliced adjustable supporting strut forming a wall of the carousel filter frame;

FIG. 1C is a side view of a securing sleeve of the spliced supporting strut shown in FIG. 1B;

FIG. 1D is a plan view of a top centre ring of the carousel roof;

FIG. 1E is a sectional view of the top centre ring shown in FIG. 1D;

FIG. 1F is a perspective view of a complete configuration of the carousel filter frame covered with filtering medium;

FIG. 1G is a plan view of the upper ring and lower ring interconnected;

FIG. 1H is a sectional view of the assembled rings in FIG. 1G;

FIG. 1I is an elevational view of an arc shaped strut;

FIG. 1J is an elevational view of a fixed length strut;

FIG. 2 is a perspective view of another embodiment of the present invention;

FIG. 3A is a perspective view of a top shield roof structure of the frame;

FIG. 3B is a perspective view of the body of the frame in FIG. 2;

FIG. 4A is an elevational view of a strut element;

FIG. 4B is an elevational view of an adjustment strut;

FIG. 4C is a perspective view of a further embodiment of the present invention;

FIG. 4D is a plan view of various sizes of rings snapped together within a larger ring;

FIG. 4E is a sectional view along line 4E—4E of FIG. 4D;

FIG. 5A is a perspective view of a shield according to the present invention;

FIG. 5B is a perspective view of a cooperating generally cylindrical body for connecting a top portion shown in FIG. 5A;

FIG. 6 is a perspective view of a still further embodiment of the present invention;

FIG. 7A is a perspective view of the top portion of the embodiment of FIG. 6;

FIG. 7B is a perspective view of the bottom portion of the embodiment shown in FIG. 6;

FIG. 8A is a perspective view of a corner element for use in the present invention;

FIG. 8B is an elevational view of a retainer pin for use in the present invention;

FIG. 8C is an elevational view of a strut for use in the present invention;

FIG. 8D is a perspective view of an assembled square filter frame unit;

FIG. 8E is an elevational view of an adjustable tubular strut;

FIG. 8F is a plan view of a connecting member for connecting struts;

FIG. 8G is an elevational view of an adjustable strut;

FIG. 8H is an elevational view of a sleeve member for securing the adjustable strut illustrated in FIG. 8G;

FIG. 10A is a perspective view of a corner element for use in the present invention;

FIG. 10B is an elevational view of a retainer pin for use in the present invention;

FIG. 10C is an elevational view of an adjustment strut for use in the present invention;

FIG. 10D is an elevational view of a sleeve for use in the present invention;

FIG. 10E is an elevational view of a further embodiment of an adjustment strut for use in the present invention;

FIG. 10F is an elevational view of a further embodiment of the sleeve for use in the present invention;

FIG. 10G is a plan view of a connecting member for use in the present invention;

FIG. 10H is a plan view of a small top centre ring for use in the present invention;

FIG. 10I is a plan view of a connected upper ring and lower ring;

FIG. 10J is a sectional view along the line 10J—10J of FIG. 10I;

FIG. 10K is an elevational view of a further embodiment of a tubular adjustable strut for use in the present invention;

FIG. 10L is an elevational view of yet another embodiment of a tubular adjustable strut for use in the present invention;

FIG. 10M is an elevational view of a further embodiment of a strut for use in the present invention;

FIG. 10N is an elevational view of yet another embodiment of a strut for use in the present invention;

FIG. 10O is an elevational view of a further embodiment of an adjustable strut for use in the present invention;

FIG. 10P is a cross-sectional view of FIG. 10H;

FIG. 11 is a sectional view of the top portion of an air filter frame formed by the connection of the elements illustrated in FIGS. 3A and 3B;

FIG. 12 is a sectional view of the embodiment of FIG. 1F;

FIG. 13 is a cross-sectional view of the air filter of FIG. 2; and

FIG. 14 is a perspective view of yet another embodiment of the present invention.

Similar numerals used in the figures denote similar elements.

DETAILED DESCRIPTION OF THE PREFERRED EMBODIMENTS

Figure 9A:
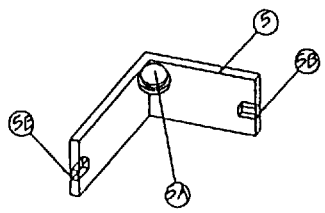
FIG. 9A is a perspective view of a corner element for use with the present invention.

The invention is collapsible, the frames and the supporting members (struts) are expandable and adjustable thus affording great adaptability. The air filter frame elements can be all snapped together tightly by known industrial connecting means utilizing either male or female ends.

Once the frame has been assembled, a factory made tailor-fitted piece of polyurethane filtering foam or other filtering material may be wrapped neatly around the outside of the frame conforming to its shape. When the outside of the frame has been covered with the filtering medium, both top and bottom perimeters are covered by flexible foam over to the inside edges of the frames. The foam contours to irregularities on the bottom and top of the filter frame and forms an effective resilient seal when the air filter housing cover of the vehicle is secured on them.

All shapes of the invention can be transformed from their two very basic forms by utilizing the components displayed in FIG. 10; one is circular in shape and the other is square in shape.

The filter frame when in the form of a carousel forms the skeleton of a complete filter body and is comprised of a small top ring, tubular shape supporting struts, upper ring, flat shape supporting struts and bottom ring.

The small top ring, displayed in FIG. 1D and FIG. 1H is the top supporting member of the shield shape roof of the invention. It facilitates the securing of the tubular shape adjustable supporting struts and also supports a rubber sealing ring 1B with a central hole 1C, this central hole is to accommodate a central shaft 9 shown in FIGS. 11, 12 and 13, which is perpendicular to and rises from the carburetor (not shown). The function of the small top ring 1 is to position the filter frame and the filter medium which results in even distribution of the downward pressure on the radially spaced supporting struts 2 and strut 4, when the wing-nut 8 in FIG. 11 is screwed down on the shaft to the air filter housing cover. The downward pressure presses on the foam medium and the rubber seal resulting in an air tight resilient effect. 1D represents indentations spaced around the perimeter of the small top ring. These indentations are the connecting points of the hook ends of the strut 2C. 1A is the connecting rest bar that the strut 2C hooked on.

In FIG. 10I displays various sizes of ring within other rings, two sets of ring(s) of same can be used simultaneously as upper ring 3 and lower ring 6. All the rings in the invention, except the small top ring 1, are adjustable in diameter by adapting a larger or smaller ring and are designed to be joined by two hinges or other snap-on mechanical means in the middle 3A of the rings, allowing rings to be folded or separated in half for transforming into other shapes and for added compactness or for expansibility to fit various filter diameters and for shipping. All rings may be manufactured in one piece when required. For added versatility in accommodating a vast number of various filter sizes, all rings can be joined together in two or three to form the desired filter frame diameter. The adaptability is made possible as each upper ring 3 or lower ring 6 has threads on the outside circumference 3B and the inside circumference 3C in FIG. 10J. The threaded outside circumference of a smaller ring can be easily joined together by a larger ring with threaded inside circumference. The purpose is to obtain the nearest inside diameter and/or the nearest outside diameter of a required specific air filter application at the manufacturing site from the in-stock threaded rings. Alternative methods for joining the frames together but not limited to, are by screws or by other methods such as other male and female joints known in the industry.

In the invention, many methods of altering the length of the supporting adjustable struts to meet desired frame lengths can be utilized. The exemplified components of the invention and their connecting means are shown in FIG. 10. The supporting struts may be adjusted in the following manner, by utilizing the following methods only for the purpose of demonstrating the validity of the invention. The following adjusting methods are exemplary only.

The first type of the supporting strut 2 of the invention has a long thin tubular body shown in FIGS. 10K and 10L. Both ends of the tubular body are threaded inside in order to receive outside threaded extension end pieces. This allows for the extension or contraction of the pieces once they are connected. There are three extension arm pieces with different fitting ends which can be secured in position by the lock nuts 2A.

Figure 9B:
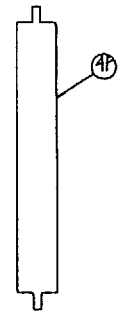
FIG. 9B is an elevational view of a strut for use in the present invention.
Figure 9C:
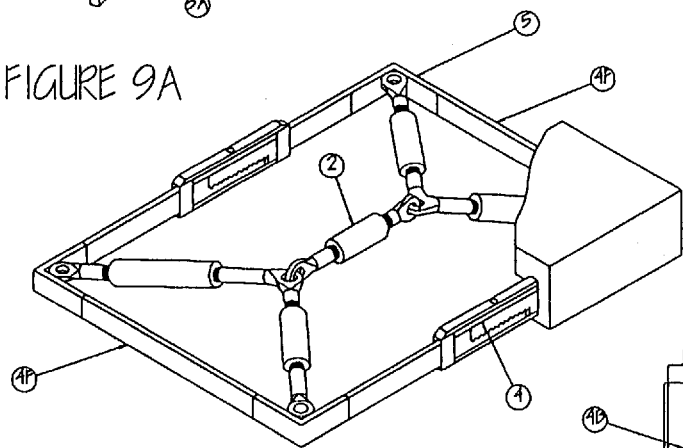
FIG. 9C is a perspective view of a further embodiment of the present invention illustrating a rectangular filter frame.
Figures 9F, 9G:
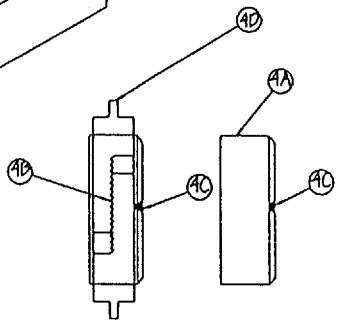
FIG. 9F is an elevational view of an adjustable strut.
FIG. 9G is an elevational view of a sleeve for retaining in position the adjustable strut illustrated in FIG. 9F.
Figures 9D, 9E:
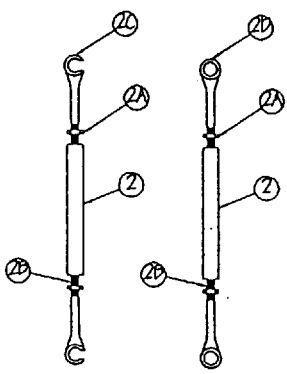
FIG. 9D is an elevational view of one tubular strut embodiment for use in the present invention.
FIG. 9E is an elevational view of a second embodiment of a tubular strut for use in the present invention.

The round end with small centre hole 2D in FIG. 8E is for use in forming the inner frame of the square frame in FIG. 8D and rectangular frame in FIG. 9D. The round end 2D when connecting with an eyelet 5A positioned at the inner corner of the 90° rigid corner piece 5 is secured by a retainer pin 10 in FIG. 8B and FIG. 9B.

The connecting method utilizing a retainer pin 10 allows movement at the joint and permits flexibility for expansion and contraction of the filter frames should the outside adjustable struts be lengthened or shortened to meet the need of a longer or shorter filter frame.

The hook end 2C is used when connecting onto the rest bar 1A which rest bars are spaced around the outer edge of the small top ring 1. The hook end 2C which rides on the rest bar is able to pivot up and down thus allowing the adjustable strut 2 which supports the foam media to form various heights. To coordinate with the channel hitch 2F, the small top ring 1 is also free to move up or down on the central perpendicular shaft 9 in FIGS. 11, 12 and 13, which rises from the centre of the carburetor (not shown) if the adjustable struts are lengthened or shortened.

The channel hitch 2F is used to connect to the inside edge of the upper ring 3, positioned in the middle of the carousel shaped filter frame. The channel hitch 2F by itself is connected to a round end 2D by a retainer pin shown in FIG.

10B. The channel hitch 2F has the flexibility to pivot 90° thus enabling the adjustable struts 2 which support the foam media to form various heights.

The second type of the supporting struts 4 of the invention are comprised of adjustable struts and non-adjustable struts shown in FIG. 10C and FIG. 10E. The adjustable strut 4 is manufactured in varying lengths but can be further extended from or retracted to its manufactured length to meet various length requirements. The adjustable strut 4 is comprised of three pieces, two pieces of which are identical each having a male tenon joint 4D on one end, the other ends of the two parts of the struts have a splice joint 4B. The third piece of the strut is a sleeve 4A which is capable of moving up or down the two pieces and when secured in place over the spliced joint 4B by a lock nut 4C, thus a rigid strut 4 is made. The non-adjustable struts 4E in FIG. 10M and 4F in FIG. 10N can be made in various desired lengths for specific applications when production volume justifies. The bevel adjustable strut 4G in FIG. 10O is the supporting strut specifically for the cone shaped frame. Bevel strut 4G can be manufactured in the adjustable form or the rigid form whichever is desired by requirements.

Adjustable strut 4 and bevel strut 4G and non-adjustable struts 4E and 4F are snapped into female joints in the filter frame by male joints 4D which are located at either end of the struts. The male joints of these struts can be made in various joint already currently in use in the automotive parts or mechanical industry. The adjustable bevel strut 4G is solely used as the supporting members for the cone shaped filter configuration in FIG. 4. All the other adjustable struts 4 and non-adjustable struts 4E and 4F, can be adapted for usage as perpendicular supporting members in the filter frames and horizontal reinforcing members for square filter frames shown in FIG. 7 and for rectangular filter frames shown in FIG. 8.

The 90° corner frame 5 in FIG. 10A is a rigid member but can be lengthened by inserting an adjustable strut 4 or a non-adjustable strut 4F into the female connecting joints 5B. The 90° corner frame comprises a connecting eyelet 5A and two female connecting ends 5B.

Because of the adjustability of all the supporting member struts, the separable and adaptable frame rings, and their flexibility enables the invention to be transformed from one shape into many different shapes of three dimensional forms. The invention's configurations may be compared to the form of a carousel, to a shield, to a thick circular ring, to a cylinder, to a cone, to an oval figure which can be compared to the shape of a racetrack, or a shape comparable to a circus tent. Other forms of filter frame are created when 90° angles are utilized with adjustable struts. A square can be formed and then transformed into rectangular shapes, or any other right angled shape required for the filter frame to be used in. With the great versatility in lengthening or shortening the supporting struts, adjusting the inside and outside diameters of the supporting rings and extending the lengths of the 90° angles, almost any necessary filtering frame shapes used on internal combustion engines can be adapted to and achieved.

EXAMPLE ONE

The present invention forms one complete assembly in the form of a carousel in FIG. 1 and shown in sectional view in FIG. 12. The carousel is comprised of a small top ring 1, two large circular rings, one upper ring 3, the second bottom ring 6 and two sets of adjustable supporting struts. The upper set of struts 2 are tubular and the lower set of perpendicular struts 4 are flat. This carousel filter frame has a roof configuration which can be compared to a shield in shape.

The shield shaped roof filter frame is formed by joining a small top ring 1 to the first large ring 3 by a series of adjustable struts 2 which are supporting members. The struts 2 are spaced radially with one end 2C being hooked onto the rest bar 1A of the small top ring 1 and other end of the struts, each which have a channel hitch 2F are snapped into place on the inner rim of the circular ring 3 which becomes the bottom part of the filter frame in the configuration of a shield shaped roof. Because the struts are flexible, contractile and extendable, these features make possible the shield shaped roof assembly to be raised or lowered on the shaft 9 shown in FIG. 12.

Various ring diameters can be used to accommodate the usage of various sizes of filter frame parts and medium.

The wall section of the carousel is comprised of a series of perpendicular struts 4, both ends of the struts have the same tenon joints 4D. The struts upper ends are snapped in place into the mortised joints of the lower side of the above described large bottom member which is ring 3 of the shield shaped roof assembly. They form an alignment with the supporting struts 2 of the shield shaped roof. To complete the lower circular assembly, a second identical large circular ring 6 is snapped into place at the other end of the said perpendicular struts 4. The ring 3 now becomes the upper ring of a complete carousel frame assembly and the ring 6 becomes the bottom member of the carousel shaped frame. A completed carousel shaped filter frame assembly is shown in FIG. 1F.

The invention is a carousel shaped filter frame having a shield shaped roof which may be described as the roof of the carousel filter frame. When a foam filter medium is used on this shield filter frame shown in FIG. 1, a greater filtering capacity is created, for example, about 26% more filtering medium is utilized than the traditional circular shape filter of the same model. This added filtering medium allows for greater filtering capacity as described as follows and shown in FIGS. 1, 2, 3, 5, 6, 7, 11, 12 and 13 which shows the advantage with the added filtering capacity and the configuration change.

The greatly increased efficiency of the carousel shaped filter frame can easily be recognized by the large increases in filtering area and volume which is comprised in the roof area of the carousel filter frame. The height of the sidewall of the carousel filter frame is marginally reduced to allow for the forming of the shape of the carousel. However, in relation to the traditional shaped circular filter, the roof area of the new carousel filter becomes part of the filtering area and enhances the filtering capacity by about 26% in the following example. The increased area of the carousel filter as compared to the traditional shaped circular filter can be calculated as follows:

Carousel filter filtering area in body=length×width 3"×20"=60 sq. in.

Area in roof=Pi×Radius×Slant Side 3.14×3½×3.75=41 sq. in

Total filtering area of carousel filter=101 sq. in.

Conventional circular filter area=length×width

Increased filtering area of carousel filter=21 sq. in

In the above example, a conventional filter was used having the following dimensions: length 20 inches, width 4 inches and when joined together to form a circle a diameter of 7 inches.

In the above example, the invention carousel filter was compared to the conventional filter having the same circumference but a one inch shorter height to accommodate the carousel roof.

For this particular example, the invention air filter frame accommodates an additional filtering surface area of 21 square inches or 26% more capacity than the conventional air filter.

The concept of the new carousel shaped filter was designed for its increased filtering capacity. The carousel filtering body design which is revolutionary in concept and the form was chosen because it enables a much greater volume of air flow through the filter frame. This greater air volume is possible because the roof area or top of the carousel shaped air filter is claimed for filtering capacity which is not utilized in the conventional circular air filter. The reduced wall height of the carousel filter is offset by the greatly enhanced top or roof area filtering capacity. The carousel shaped design was engineered to allow the greater flow of air not only through the circumference sides but also to pass over and through the roof area of the carousel shaped filter and into the carburetor. The service area increase in air filtration of the carousel air filter allows the user not only 26% more filtering capacity by square surface area but also a much longer utility life than the conventional air filter. The foregoing benefits to not include a further enhancement which is the additional air filtering medium material which is also having a greater depth or volume capacity. The above described filter top or roof design, which is the carousel roof shaped filter frame, can be applied to the filter frame hereinafter described as the oval-circus-tent shaped frame.

EXAMPLE TWO

The present invention, the carousel shaped filter frame shown in FIG. 1, by extending the perpendicular adjustable supporting struts 4 which if required can be replaced with a longer set of adjustable supporting struts 4, enables the wall of the carousel shape to be transformed into an elongated carousel shaped filter frame forming a distinct collapsible cylindrical filter frame with a top which can be compared to a shield shaped roof. This distinct filter frame wrapped with filtering medium in FIG. 2 and shown a sectional view in FIG. 13, fits larger types of internal combustion engines.

EXAMPLE THREE

The present invention in FIG. 3, by removing the small top ring 1 and all the adjustable supporting struts 2, the assembly is transformed into a cylindrical shaped air filter frame which can be collapsed for shipping. When foam medium is wrapped around this frame, it becomes a complete cylindrical air filter. There is another schematic transformation of this cylindrical air filter. It can be directly transformed from a circular shape shown in FIG. 4 by extending the length of its adjustable struts 4, a set of adaptable rings, upper ring 3 and bottom ring 6 shown in FIG. 3B can expand the diameter of the cylinder shaped filter frame, thus enabling it to fit larger air filter housings and forming a filter frame which can accommodate larger depth filter materials. Where longer size cylindrical filter models are required, a centre ring 11 can be mortised mid-length shown in FIG. 14 into the adjustable supporting struts 4 to provide rigidity to the lengthened struts.

EXAMPLE FOUR

The invention described in Example Three and shown in FIG. 3, the cylindrical shape, by replacing the upper ring 3 with a smaller size ring 3 shown in FIG. 10I and with the adaptability of the rings and the adjustable bevel struts 4G in FIG. 4B and FIG. 10H, the cylindrical filter frame shape can easily be modified and transformed into a collapsible cone shape air filter frame, non-adjustable bevel strut FIG. 4A can also be used when required FIG. 4C.

EXAMPLE FIVE

The present invention in FIG. 5, by splitting the carousel structure in FIG. 1F into two parts; the shield shaped roof top and the bottom carousel shaped wall, two individual air filter frames are formed. The top or roof of the carousel in its self forms a filter frame in the appearance of a shield show a sectional view in FIG. 11. This shield shaped filter frame would be suitable for smaller vehicles having a smaller filter compartment such as those found in a 1989 model year Toyota Tercel model.

EXAMPLE SIX

The present invention in FIG. 1 and in FIG. 5, by removing the shield shaped roof structure of the invention, the remaining assembly is transformed into a circular shape, thus forming a circular shaped collapsible filter frame. When filtering media is wrapped around this frame, a complete filtering body is produced as shown in FIG. 5B.

EXAMPLE SEVEN

According to the invention in FIG. 1, the carousel frame structure can be transformed into an oval shaped filter frame having a similar carousel roof FIG. 6 and this shape may be compared to a circus tent configuration of a filter frame. This transformation is easily achieved by splitting the two circular rings in half, making four halved rings to which four identical length adjustable struts in FIG. 10C or in FIG. 10E are added to four half rings 3 and ring 6. The half rings are then joined horizontally to each other by the struts which are snapped together by the connecting means. The carousel shaped filter frame is thus transformed into a distinct oval shaped filter frame with a roof, which in form may be compared to a circus tent configuration. This circus tent configuration of a filter frame can then be separated into two distinct filter frames as shown in FIG. 7.

EXAMPLE EIGHT

The present invention in FIG. 6 and in FIG. 7, by removing the top small ring 1 and struts 2, transforms the remaining filter frame into an oval shaped assembly which in form can be compared to a configuration of a two tier race track displayed in FIG. 7B. A distinct oval shaped air filter is formed from this frame when filtering medium is wrapped around it.

EXAMPLE NINE

The square filter frame in FIG. 8 of the invention is transformed from an oval shape in FIG. 7, by taking the four rings apart and replacing them with four rigid 90° corner frames 5 in FIG. 8A. Each 90° corner frame 5 has two open ends 5B. Each of the four 90° corner ends are each joined with one end of the adjustable struts 4F by a tenon connection 4D shown in FIG. 8C.

This square filter frame shown in FIG. 8D is made from non-adjustable struts, however, when adjustability is required in a square frame, the adjustable struts 4 in FIG. 8G, can be utilized. The length of the adjustable strut 4 can be extended or retracted. With the extension or retraction of the struts, sizes of the squares can be readily changed. The square frame is reinforced by four adjustable struts 2 shown in FIG. 8D. The four adjustable struts 2 inside the square frame are each fastened to one of the 90° corner frames in FIG. 9A by snapping into an eyelet, which is molded as part oft he 90 ° corner frame. Each of the other ends of the adjustable struts are attached together by a three quarter ring 7 shown in FIG. 8F. Non-adjustable struts 4F can be used when demand justifies volume production.

EXAMPLE TEN

The square filter frame in FIG. 8 can be transformed into a rectangular filter frame shown in FIG. 9 by extending two adjustable struts 4 shown in FIG. 9G on two sides of the square frame. The interior of the 90° corner frame of the rectangular filter frame is integrated and reinforced by one adjustable struts 2 with both hook ends in FIG. 9E and four adjustable struts 2 with round ends shown in FIG. 9F. Four struts are required to secure the 90° angle frames. These adjustable struts 2 are also used in all of the shield shaped roof configurations. As shown in FIG. 8, the square filter frame, as well as the rectangular filter frame shown in FIG. 9, one end of all four struts is attached to each inside corner of the four 90° rigid angles. This attachment is made by fitting one end of the adjustable strut 2 onto an eyelet, which is molded to the 90° corner frame 5A in FIG. 9A. These round ends 2D of the four struts 2 in FIG. 9E are secured to the eyelet by a snapped-in means or can be secured by a retainer pin 8B as displayed in FIG. 8D. Other round ends of the four adjustable struts 2 are attached to a fifth adjustable strut 2 in FIG. 9D with hook ends. The function of all the struts 2 used within the rectangular and square filter frames are to provide support and adjustability, this adjustability allows flexibility for extension or retraction of frame sizes, the extension of retraction of struts 2 is synchronized with the extension or retraction of struts 4 shown in FIGS. 8D and 9C. Various sizes of rectangular and square filter frame configurations can be produced by adjusting struts 2 and 4. The rectangular and square filter frames described above are assembled by using only four types of standard parts. These four standard parts can form many sizes of filter frames which can support many sizes of filtering medium. The ease of manufacture of these four parts achieve great savings in production.

In summary, the sizes of prior art air filters are very bulky and unwieldy because the bigger the vehicle, the bigger their air filter. Because of the collapsible structural design of the invention, filter frames can easily be assembled or dismantled when compactness for storage and shipping is called for. All the supporting struts from the top and bottom filter frame and/or the reinforcement centrepiece, can be stacked neatly together for packaging. The invention can be reduced up to ⅕ of its assembled size or less (the square and rectangular shapes about ⅓). The invention's compactness makes for economical shipping/handling and for warehousing. Users of the invention will benefit from low cost processing and manufacturing. It is very adaptable for usage of various filtration materials which are suitable for wrapping around the invention. The actual filtering area of the invention is up to 26% greater than conventional filters of the same model. Because the invention allows for the use of improved filtering medium, the depth capacity of the filtering medium being used further enhances the air volume filtration. With the increased efficiencies in air filtration capacity, reduced vehicle servicing and repairs, users of the invention will enjoy a much lower budget for their overall motor vehicle operating and maintenance costs. The invention will be excellent for exporting due to the lower production costs as mentioned above.

Although embodiments of the invention have been described above, it is not limited thereto and it will be apparent to those skilled in the art that numerous modifications form part of the present invention insofar as they do not depart from the spirit, nature and scope of the claimed and described invention.

While the invention is described in connection with certain preferred embodiments, there is no intent to limit the air filter frame to those embodiments. On the contrary, the intent is to cover all alternatives, modifications, and equivalents included within the spirit and scope of the invention as defined by the appended claims.

The embodiments of the invention in which an exclusive property or privilege is claimed are defined as follows:

1. A transformable intake air filter frame, comprising:
   a plurality of different frame components for forming a filter frame when connected, at least some of said frame components being adjustable in size; and
   connecting means for releasibly connecting said frame components, whereby said components may be connected to first form a carousel configuration and said carousel subsequently transformed to a second shape by connecting different frame components.

2. The air filter frame assembly of claim 1, wherein said frame assembly comprises a cylinder, said cylinder including a plurality of spaced apart adjustable supporting strut members.

3. The air filter frame assembly of claim 1, wherein said air filter frame is collapsible.

4. The air filter frame as set forth in claim 1, wherein said second shape comprises a cone-shaped filter frame, said cone-shaped filter frame including a pair of spaced apart supporting ring members and a plurality of angular adjustment supporting struts connecting said first and second spaced apart rings.

5. The intake air filter assembly of claim 1, wherein said frame components include a plurality of adjustable struts and a plurality of half rings, said struts and rings connected to form an ovular air filter.

6. The air intake frame assembly of claim 5, wherein said ovular filter is collapsible.

7. The air intake assembly of claim 1, wherein said frame components include a plurality of 90° corner frames and adjustable struts, said corner frames and adjustable struts connected to form a square filter frame.

8. The air intake assembly of claim 1, wherein said filter frame components comprise adjustable tubular-shaped struts.

9. The air intake assembly of claim 8, wherein connecting means of said adjustable tubular struts include at least one of a round end, a hook end and a channel hitch.

10. The air intake assembly of claim 9, wherein said round end comprises an eyelet.

11. The air intake assembly of claim 1, wherein said connecting means comprises snap-lock means.

12. The air intake assembly of claim 1 in combination with a filtering medium positioned about said filter frame.

13. A filter frame kit, comprising:
    a plurality of different frame components for forming a filter frame when connected, said filter frame components, comprising:
    a plurality of adjustable elongate struts;
    a plurality of angular framed components; and,
    a plurality of arcuate framed components, each of said components having connecting means for releasibly connecting said frame components together for forming a filter frame.

14. The filter frame kit as set forth in claim 13, wherein said adjustable elongate struts comprise tubular struts.

15. The filter frame kit as set forth in claim 13, wherein said adjustable elongate struts comprise rectangular struts.

16. The filter frame kit as set forth in claim 13, wherein said angular frame components comprise corner frame components.

17. The filter frame kit as set forth in claim 13, wherein said arcuate frame components comprise half circle frame components.

* * * * *